UNITED STATES PATENT OFFICE.

HENRY WILLIAM COUPE ANNABLE, OF EGHAM, ENGLAND.

SEPARATION OF MAGNESIUM FROM COMPOUNDS AND MIXTURES OF MAGNESIUM AND CALCIUM CARBONATES.

1,347,610. Specification of Letters Patent. Patented July 27, 1920.

No Drawing. Application filed June 29, 1918. Serial No. 242,675.

*To all whom it may concern:*

Be it known that I, HENRY WILLIAM COUPE ANNABLE, a subject of the King of England, residing at Egham, Surrey, England, have invented certain new and useful Improvements in the Separation of Magnesium from Compounds and Mixtures of Magnesium and Calcium Carbonates, of which the following is a specification.

This invention relates to the separation of magnesium from compounds and mixtures of magnesium and calcium carbonates, such for example as dolomite.

It has previously been proposed to produce magnesium chlorid from magnesium carbonate by heating the carbonate with a solution of calcium chlorid in water.

According to the present invention a process for the separation of magnesium from a mixture of magnesium and calcium carbonates, such as a decomposed dolomite, consists in heating under pressure the said mixed carbonates with an alkaline earth metal chlorid, such as calcium chlorid, the said carbonates being suspended in water, separating the solid material from the liquid and, if desired, precipitating the magnesium therefrom.

The magnesium may be precipitated as a hydroxid, as for example by lime, and then the hydroxid, suspended in water, may be treated with carbon dioxid, if desired at the ordinary temperature or while heating the liquid, for the production of a carbonate or hydrated carbonate of magnesium.

Other alkaline earth metal chlorids which have been found suitable for treating the mixed carbonates are barium and strontium chlorids. The magnesium may be precipitated from the solutions produced by carbonate of sodium or potassium or a hydroxid of sodium or potassium or an alkaline earth metal, but the carbonates of the alkaline earths cannot be used for this purpose.

More particularly the object of the present invention is to obtain the magnesium from dolomite wherein the magnesium and calcium carbonates exist in the form of complex molecules, part of the calcium being replaced by the magnesium. For this reason dolomite is not attacked by the alkaline earth metal chlorids unless it is submitted to a previous treatment to separate the magnesium and calcium carbonates into individual molecules.

In order thus to decompose it the dolomite is first calcined and is then treated with carbon dioxid, for example produced by the calcination of the dolomite.

One method of carrying this invention into effect for the separation of magnesium from dolomite will now be described. The dolomite is ground and is then calcined in a current of air or steam, carbon dioxid being driven off. The calcined dolomite is suspended in water and carbon dioxid is passed through the water, whereby a mixture of magnesium and calcium carbonates is produced in which the magnesium carbonate particles are separate from the calcium carbonate particles. The carbon dioxid employed may be that obtained from roasting the dolomite or from roasting a fresh quantity thereof.

The mixed carbonates suspended in water are then placed in an autoclave, and sufficient calcium chlorid is added to convert the whole of the magnesium contents of the dolomite into magnesium chlorid. An excess of calcium chlorid should not be used as it will remain in solution with the resulting magnesium chlorid. The mixture of calcium chlorid and suspended mixed carbonates is heated and boiled, preferably under a pressure of about 4 atmospheres, whereby the magnesium carbonate reacts with the calcium chlorid to produce magnesium chlorid and calcium carbonate according to the equation—

$$MgCO_3 + CaCl_2 = MgCl_2 + CaCO_3.$$

The contents of the autoclave are then filtered, the calcium carbonate produced by the reaction and that present from the dolomite being thus separated from the solution of magnesium chlorid.

To this solution is added milk of lime to precipitate the magnesium as hydroxid, according to the following equation—

$$MgCl_2 + Ca(OH)_2 = Mg(OH)_2 + CaCl_2.$$

In this way the calcium chlorid is regenerated and may be used again in the treatment of a fresh quantity of dolomite. The precipitated magnesium hydroxid is separated by filtration from the solution of calcium chlorid. If this step be omitted, then, on subsequent treatment of the precipitated magnesium hydroxid with carbon dioxid, magnesium chlorid is regenerated:—

$$CaCl_2 + Mg(OH)_2 + CO_2 = CaCO_3 + MgCl_2 + H_2O.$$

Carbon dioxid, if desired obtained from the roasting of dolomite, may be passed through the water in which the magnesium oxid is suspended whereby a hydro-carbonate of magnesia is produced. The magnesium oxid suspended in water may, if desired, be heated during the treatment with carbon dioxid, in which case a different form of hydrated carbonate of magnesia is obtained. This may be separated from the liquid in any manner convenient, as for example by filtration.

The present invention is also applicable to the separation of magnesium from magnesite in which calcium carbonate is often present as an impurity.

What I claim as my invention and desire to secure by Letters Patent is:—

1. A process for the separation of magnesium from compounds and mixtures of magnesium and calcium carbonates which comprises calcining the associated carbonates, then treating them with carbon dioxid, then heating them suspended in water under pressure with the chlorid of an alkaline earth metal in quantity equivalent to the magnesium present.

2. A process for the separation of magnesium from compounds and mixtures of magnesium and calcium carbonates which comprises calcining the associated carbonates, then treating them with carbon dioxid, then heating them suspended in water under pressure with the chlorid of an alkaline earth metal in quantity equivalent to the magnesium present, separating the insoluble matter and precipitating the magnesium.

3. A process for the separation of magnesium from dolomite which comprises calcining the dolomite, then treating it with carbon dioxid, then heating it suspended in water under pressure with the chlorid of an alkaline earth metal in quantity equivalent to the magnesium present.

4. A process for the separation of magnesium from dolomite, which comprises calcining the dolomite, then treating it with carbon dioxid, then heating it suspended in water under pressure with calcium chlorid in quantity equivalent to the magnesium present.

5. A process for the separation of magnesium from dolomite, which comprises calcining the dolomite, then treating it with carbon dioxid, then heating it suspended in water under pressure with calcium chlorid in quantity equivalent to the magnesium present, separating the insoluble matter and precipitating the magnesium.

In testimony whereof I have signed my name to this specification in the presence of two subscribing witnesses.

HENRY WILLIAM COUPE ANNABLE.

Witnesses:
 FLORENCE KATE SCOTT,
 V. WALLINGTON.